Feb. 10, 1953      E. A. MARTINEK      2,627,934
AIR MOISTENING AND FILTERING DEVICE
Filed Aug. 11, 1949
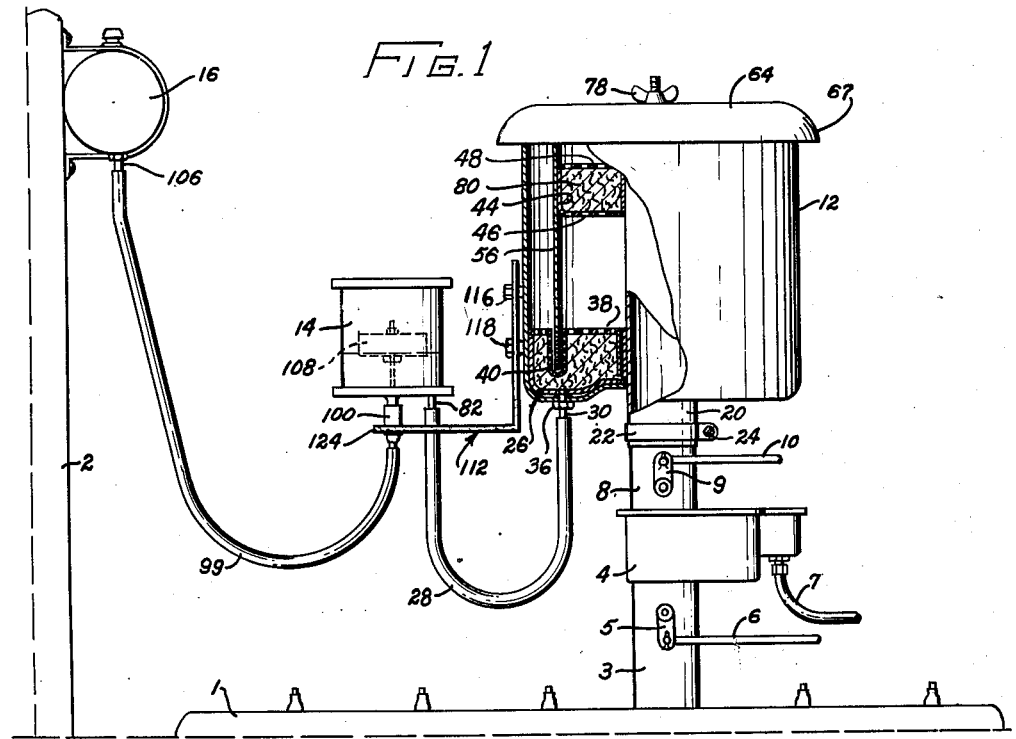
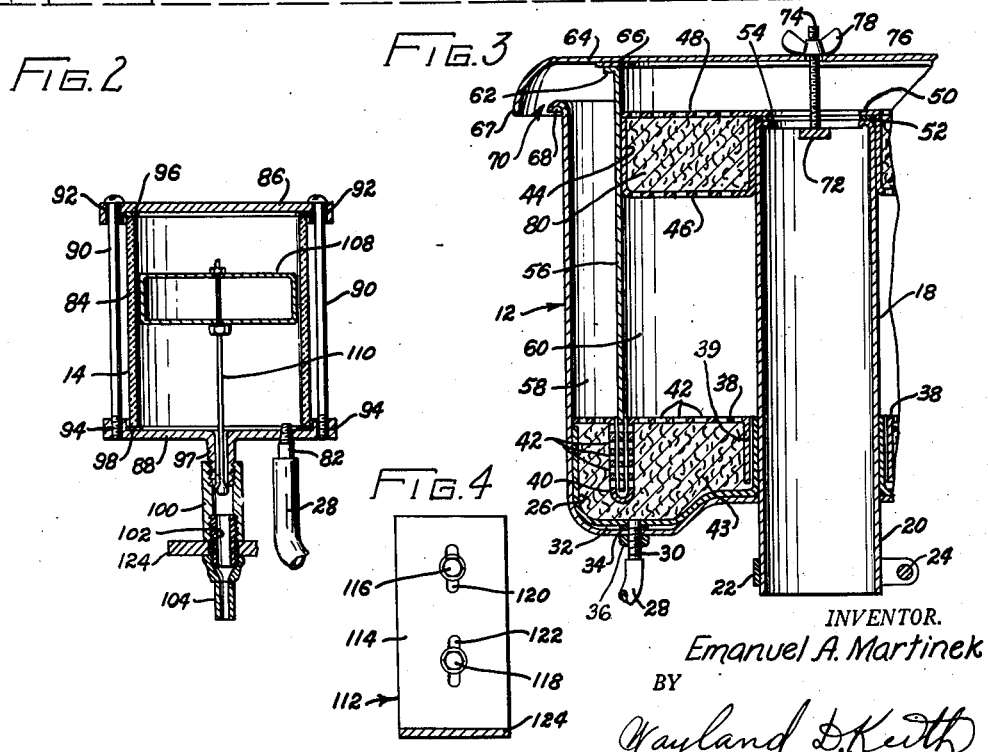
INVENTOR.
Emanuel A. Martinek
BY
Wayland D. Keith
HIS AGENT Patented Feb. 10, 1953

2,627,934

UNITED STATES PATENT OFFICE 2,627,934

AIR MOISTENING AND FILTERING DEVICE

Emanuel A. Martinek, Wichita Falls, Tex.

Application August 11, 1949, Serial No. 109,785

3 Claims. (Cl. 183—15)

This invention relates to a water supply air cleaner, and more particularly to a device for filtering and moistening air used in the fuel supply system of an internal combustion engine.

The invention is particularly applicable to the fuel systems of internal combustion engines, and has as its principal object the provision of means for filtering and introducing moisture into the air supplied to such a system, in order to promote the combustion of the fuel and increase the operating efficiency of the engine.

A further object of the invention is to provide means for maintaining a constant supply of moisture interposed in the path of air entering the fuel system to assure adequate moistening of the air under all operating conditions of the engine.

Another object of the invention is to provide means for the introduction of water vapor into the air in adequate amounts for most efficient operation of the engine, and at the same time preventing the entrance of excessive amounts of water into the fuel supply system.

A further object of the invention is to provide in a device of the character mentioned, a combined structure whose parts are readily assembled and disassembled for purposes of cleaning and repairing.

A still further object is the provision of an air cleaning and moistening device of simple design and rugged construction, capable of withstanding the hard usage to which such a device is likely to be subjected.

Briefly stated, the invention comprises a container positioned over the air intake leading to the carburetor of an internal combustion engine, within which container air passages are formed for conducting the air through and over water located in a water chamber, and through filter material positioned above the water chamber, whence the moistened air passes to the carburetor. A water supply tank is provided at a level above the water chamber, which tank is in communication with a water level regulating device in the form of a float valve and float chamber connected to the water chamber.

The invention will best be understood from the following description, constituting a specification the same when taken in conjunction with the annexed drawings wherein—

Fig. 1 is a side elevational view of the invention partly broken away and partly in section, showing the application of the moistening and filtering device to an internal combustion engine;

Fig. 2 is a vertical cross-sectional view showing in detail the construction of the water level maintaining device;

Fig. 3 is a partial vertical cross-sectional view, on a somewhat enlarged scale, showing the internal structure of the air filtering and moistening device; and Fig. 4 is a cross-sectional view of the bracket structure by which the water level maintaining device is secured in position on the moistening and filtering device.

Referring to the drawings in greater detail, the invention is shown in Fig. 1 as applied to an internal combustion engine represented generally at 1, which engine may be positioned in a vehicle provided with a fuel intake connection 3 leading from a carburetor 4 and controlled by a suitable valve arrangement indicated at 5 and adapted to be operated by a control rod 6. A fuel connection 7 is provided for conducting fuel from a source of supply (not shown) to the carburetor 4. The carburetor also has the customary intake connection 8 controlled by a suitable valve arrangement, indicated at 9 and adapted to be operated by a control rod 10.

The above-described elements are all of customary design and structure, forming no part of the present invention, and are included to more fully illustrate the application of the same.

The air moistening and filtering device is applied to the inlet connection 8 of the carburetor 4, in the manner illustrated in Fig. 1, and comprises in its broadest aspect, a container 12 through which the air entering the intake must pass and wherein the air is moistened and filtered, a water regulating device, indicated at 14, whereby the level of the water in the water chamber is maintained, and a water supply tank or reservoir 16, which may conveniently be attached to the dashboard 2 at some point above the level of the water to be maintained in the water chamber.

The container 12 is preferably in the form of a shell of generally cylindrical formation, having a centrally positioned tubular member 18 secured therein, which has a portion 20 extending below the bottom of the container for connection with the intake 8 of the carburetor. A split collar 22 may be positioned on the portion 20, which collar is secured by a bolt 24 for attaching the container to the intake.

Within the bottom of the container 12, surrounding the tubular outlet member 18, is located an annular tray 26 forming a water chamber to receive water for adding moisture to the air passing through the device. The tray 26 is supplied with water through a tube 28 attached to an externally threaded connector 30 passing through the bottom of the container and the adjacent bottom portion of the tray.

Between the bottom of the tray 26 and the bottom of the container is provided a space 32 in which is positioned a nut 34 threaded on the connector 30. A nut 36 on the connector 30, externally of the bottom of the container, serves to secure the connector thereto.

An annular perforated cover member 38 is positioned above the tray 26 and is formed with a downwardly extending flange 39 projecting into the tray adjacent the inner wall thereof surrounding the tubular outer member 18. This annular member 38 has a downwardly extending annular portion 40 formed therein, which portion extends within the tray 26 for a purpose later to be made apparent herein. The annular cover member 38 and its channel portion 40 are both provided with perforations as indicated at 42, in Figs. 1 and 3, the perforations 42 in the channel portion 38 extending through both vertical walls thereof. The channel portion 40 forms, in effect, a baffle element extending beneath the level of the water in the water chamber and functions to secure improved distribution of moisture in the air when the air demand of the internal combustion engine is relatively great. The tray 26 may be filled with a filtering material 43, such, for example, as a corrosion resistant metallic wool or other equivalent material having suitable physical properties for the purpose of securing better distribution of the moisture in air passing through the device.

An annular receptacle 44, having a perforated bottom portion 46 and provided with a perforated closure 48, is located within the upper part of the container surrounding the tubular member 18. The closure 48 extends inwardly beyond the tubular member 18, as best seen at 50 in Fig. 3, and may conveniently engage a gasket 52 resting upon the inturned end portion 54 of the tubular member.

A cylindrical partition member 56 is positioned inside the container 12 to define an air inlet passage 58 and an intermediate air passage 60 therein, which passages are in communication through the perforations 42 in the annular cover member 38 and in the channel portion 40, as well as through the tray 26 beneath the channel portion 40. The lower end portion of the cylindrical partition member 56 forms a baffle extending into the channel portion 40, and this is perforated as seen in Figs. 1 and 3, which perforations may be arranged in alignment with the perforations 42 in the channel portion 40, or they may be adjusted in any suitable manner to partly restrict the flow of air therethrough. The member 56 may be formed with an out-turned flange 62 upon which the lid 64 for the entire container rests. A packing ring 66 may be positioned beneath the lid between the same and the out-turned flange 62. The lid 64 is formed with a down-turned edge portion 67 and the upper end of the container has an out-turned lip 68 formed thereon. The cover is supported with the down-turned edge 67 in spaced relation to the out-turned lip 68 to provide a passage 70, forming a continuation of the inlet passage 58 through which air is drawn into the container.

Across the upper end of the tubular outlet member 18 a bar 72 is secured in any convenient manner to the in-turned portion 54. A bolt 74 is secured to the bar 72 and extends upwardly therefrom through opening 76 in the central portion of the lid 64. By means of a wing nut 78 on the bolt 74, the cover is retained securely in place on the container. As seen in Fig. 3, the central portion of the lid 64 is spaced above the upper end of the tubular member 18 to form a passage connecting the annular passage 60 and the tubular member.

A suitable filtering material 80, such as, for example, that used in the water chamber, is placed in the receptacle 44 to assure the removal of any dirt or excess water from the air passing therethrough.

Water is maintained in the annular tray 26 to the level indicated by the dotted line therein, as seen in Figs. 1 and 3, and from the above description of the moistening and filtering device it will be seen that air drawn into the container through the passage 70 between the cover and the upper end of the container passes downwardly through the annular passage 58, through perforations 42, to contact the wetted filtering material in the tray 26.

When the amount of air thus drawn into the container is small, the air will pass through the perforations in the channel portion 40 and the perforations in the cylindrical member 56 which lie above the water in the water chamber, and thence upwardly through passage 60 and filter material 80, downwardly through tubular member 18 and into the carburetor 4 through the intake connection 8.

Thus, when only small amounts of air are being used by the engine, the moisture added thereto by contact of the air with the wetted filter material 43 in the tray 26 may alone be sufficient for efficient operation. In the event, however, that a large amount of air must be passed through the device, to satisfy the operating demand of the engine, the perforations lying above the water level in the tray 26 will not be large enough to accommodate all of the air, resulting in some of the air being forced through the perforations lying beneath the water to emerge therefrom in the form of bubbles. In this manner the introduction of the additional moisture required to properly moisten a large amount of air may be accomplished without any adjustment of the apparatus being necessary.

For the purpose of maintaining the water level in the tray 26, the tube 28 is connected by a suitable coupling 82 to the water level regulator 14, as indicated in Figs. 1 and 2. The water level regulator is preferably in the form of a transparent cylindrical container 84 having top and bottom covers 86 and 88, respectively, secured thereto by means of threaded rods 90 passing through openings 92 in the top cover, and threaded into openings 94 in the bottom cover. Packing rings 96 and 98, respectively, may be positioned between the top and bottom covers and the ends of the cylindrical container 84 to assure a water tight fit.

The bottom cover 88 is also provided with an externally threaded pipe connection 97 located centrally thereof, to which a tube 99 is connected by means of the internally threaded coupling element 100, coupling 102, and tube connector 104.

The tube 99 leads to the water supply tank 16 to which it is attached by the tube connector 106.

The water level regulating device includes a float 108 within the cylinder container 84, to which is attached a valve member 110 seating at the lower end of the pipe connection 97. It will be noted that the valve 110 is closed upon upward movement of the float and opened upon downward movement of the same, and due to the fact that the water supply tank 16 is above the regulator the water level in the latter is always maintained as indicated in dotted line in Fig. 1.

Moreover, the tray 26 is in communication with the water level regulator through tube 28, thus assuring that the water in the tray will at all times be maintained at the same level as in the regulator.

The water level regulator is conveniently attached to the container 12 through the use of a bracket 112 having a vertical portion 114 secured to the container by bolts 116 and 118 extending through slots 120 and 122 in the bracket for the purpose of permitting vertical adjustment of the position of the water level regulator with relation to the container. The water level regulator is attached to the horizontal portion 124 by clamping thereon between the coupling member 100 and the connector 104, the coupling element 102 extending through a hole in the bracket. The tube 28 may also be extended through a hole in the bracket portion 124, as seen in Fig. 1.

With the various parts constructed and arranged in the manner described the invention is readily applied to many different types of internal combustion engines without making any substantial changes in the fuel systems of the same, or in the moistening and filtering device. It will also be seen that the parts of the device located in the container 12 can be easily assembled, or they may be taken out for purposes of cleaning or repair, by merely removing the wing nut 78 from the bolt 74, after which the lid 64 can be lifted off and the various parts lifted out in turn.

Without further description, it is thought that the features and advantages of the invention will be readily apparent to those skilled in the art, and it will be recognized that various changes and modifications in the construction and arrangement of the parts may be resorted to without departing from the spirit of the invention or the scope of the appended claims.

Having thus clearly shown and described the invention, what is claimed as new and desired to secure by Letters Patent is:

1. In a device for moistening and filtering air for use in the fuel system of an internal combustion engine, a container having air inlet and outlet passages, means for connecting said air outlet passage in communication with the air intake of said fuel system, a water chamber formed in said container in communication with said inlet and outlet passages, a perforated cover member on said water chamber having an annular portion extending into said water chamber beneath said level of the water in said chamber, a partition in said container between said inlet and outlet passages and extending into said annular portion beneath the level of the water in said chamber, said annular portion and the portion of said partition in said annular portion having perforations therein.

2. In a device for moistening and filtering air for use in the fuel system of an internal combustion engine, a container having air inlet and air outlet passages and an intermediate passage communicating with said inlet and outlet passages, means for connecting said air outlet passage in communication with the air intake of said fuel system, a water chamber formed in said container and communicating with said inlet passage and said intermediate passage, a cover on said water chamber having perforations formed therein, a perforate annular portion extending into said water chamber beneath the level of said water in said chamber, and a perforate partition between said inlet and said intermediate passage, said perforate partition extending into said perforate annular portion.

3. In a device for moistening and filtering air for use in the fuel system of an internal combustion engine, a container having an air inlet and an air outlet passage therein, means for connecting said air outlet passage in communication with the air intake of said fuel system, a water chamber formed in the lower portion of said container, a cover member having perforations formed therein fitted on said water chamber and having an annular perforate portion extending into said water chamber beneath the level of said water therein, filtering material disposed within said water chamber below said cover, a partition in said container between said air inlet and said air outlet passages and extending into said annular perforate portion, and the lower portion of said partition having perforations formed therein for the passage of air therethrough.

EMANUEL A. MARTINEK.

REFERENCES CITED

The following references are of record in the file of this patent:

UNITED STATES PATENTS

| Number | Name | Date |
|---|---|---|
| 1,567,313 | Wilson et al. | Dec. 29, 1925 |
| 2,021,524 | Sondburg | Nov. 19, 1935 |
| 2,046,093 | Schaaf et al. | June 30, 1936 |
| 2,459,428 | Jacobi | Jan. 18, 1949 |
| 2,509,510 | Lee et al. | May 30, 1950 |